United States Patent [19]

Sakon et al.

[11] Patent Number: 4,879,067
[45] Date of Patent: Nov. 7, 1989

[54] RED PHOSPHORUS FLAME RETARDANT AND NONFLAMMABLE RESINOUS COMPOSITION CONTAINING THE SAME

[75] Inventors: Ichiro Sakon, Toyama; Masao Sekiguchi, Uozu; Atsushi Kanayama, Toyama, all of Japan

[73] Assignee: Rinkagaku Kogyo Co., Ltd., Shinminato, Japan

[21] Appl. No.: 40,522

[22] Filed: Apr. 17, 1987

[30] Foreign Application Priority Data

Jun. 19, 1986 [JP] Japan ................................ 61-143714
Oct. 27, 1986 [JP] Japan ................................ 61-255419

[51] Int. Cl.$^4$ ............................................ C07K 21/00
[52] U.S. Cl. ..................................... 252/609; 252/601; 252/602; 260/DIG. 24; 423/322; 423/323; 427/221; 428/407; 523/205
[58] Field of Search ....................... 252/601, 609, 397; 428/407; 427/221; 260/DIG. 24; 423/322, 323, 266, 274

[56] References Cited

U.S. PATENT DOCUMENTS

| | | | |
|---|---|---|---|
| 3,931,081 | 1/1976 | Dany et al. | 524/387 |
| 3,963,669 | 6/1976 | Wurmb et al. | 524/492 |
| 4,067,897 | 1/1978 | Ducloux | 524/607 |
| 4,071,584 | 1/1978 | Birum | 524/607 |
| 4,092,460 | 5/1978 | Cerny et al. | 524/80 |
| 4,273,752 | 6/1981 | Lehr et al. | 423/322 |
| 4,315,897 | 3/1982 | Staendeke et al. | 423/274 |
| 4,330,504 | 5/1982 | Lehr et al. | 422/205 |
| 4,420,880 | 10/1984 | Albanesi et al. | 523/205 |
| 4,421,728 | 4/1983 | Twardowska | 423/265 |

FOREIGN PATENT DOCUMENTS 0176834 9/1986 European Pat. Off. .
54-39200 2/1979 Japan .
55-10462 6/1980 Japan .

OTHER PUBLICATIONS

Hawley, 1981, The Condensed Chemical Dictionary—10th edition, Van Nostrand Reinhold Co., New York, p. 810.
Rose, A., 1966, The Condensed Chemical Dictionary—7th Edition, Reinhold Pub. Co., New York, p. 740.
Kirk-Othmer Encyclopedia of Chemical Technology, 1968, John Wiley & Sons, Inc., New York, vol. 15, p. 286.

Primary Examiner—Howard J. Locker
Attorney, Agent, or Firm—Flynn, Thiel, Boutell & Tanis

[57] ABSTRACT

A flame retardant comprising of spherical red phosphorus free of pulverized face which is directly produced in the form of fine powder by conversion of yellow phosphorus, without pulverizing process. The red phosphorus characterized by its surface state and shape entirely different from any prior pulverized red phosphorus has not only a high flame retarding ability, but also a superior combination of chemical and physical properties, particularly with regard to corrosion resistance, moisture resistance, mechanical strength and dielectric properties which make it highly valuable and useful as a flame retardant for various nonflammable resinous compositions used in electric articles including electronic parts, machines, automobiles and buildings. The flame retardant is desirably coated with thermosetting resin and/or hydroxide of aluminum and/or zinc, thereby greatly improved in its stability.

16 Claims, No Drawings

RED PHOSPHORUS FLAME RETARDANT AND NONFLAMMABLE RESINOUS COMPOSITION CONTAINING THE SAME

BACKGROUND OF THE INVENTION

1. Field of the Invention

The present invention relates to a red phosphorus flame retardant and a nonflammable resinous composition containing the same. In particular, the present invention is directed to a red phosphorus having a special surface configuration which has been produced by a special process and a nonflammable resinous composition containing the red phosphorus which composition is greatly improved in its moisture-resistance, corrosion-resistance and heat resistance. Further, the present invention is directed to the provision of a nonflammable resinous composition which can be easily and safely handled and is highly stable.

2. Description of the Prior Art

Since red phosphorus is useful as a flame retardant for synthetic resins, it has been heretofore used in thermosetting resins and thermoplastic resins to provide various nonflammable resinous compositions which have been extensively utilized in a variety of applications, such as electronic components or parts, electric articles, machines, automobiles, buildings, etc.

However, when red phosphorus is used as it is, the following problems have been encountered because of its lability and sensitivity to heat, friction and shock. Namely, red phosphorus presents a danger in handling, storing and mixing with resins;

formation of poisonous phosphine gas and oxidation products is caused due to the reaction of red phosphorus with moisture in the air, thereby polluting the working environment and impairing the physical and electrical properties of resinous compositions; and there are difficulties in preparing a nonflammable composition due to the lack of compatibility with synthetic resins.

For these reasons, various ways of stabilizing the red phosphorus flame retardant with various organic or inorganic substances have been tried in order to overcome the foregoing problems but they have been entirely successful. Accordingly, the use of the red phosphorus flame retardant is restricted to certain fields and it has been difficult to satisfy the requirements for high qualities.

Presently, the red phosphorus flame retardant has been extensively used as a flame retardant for thermosetting resin, particularly epoxy resin, and has been mainly used in insulating cast resinous compositions for use in electronic components for high voltage applications.

However, in recent years, with an increasing trend toward miniaturization and high-voltage application in electric or electronic articles, increasing demand is being directed to electrically insulating materials with a high performance. For such a demand, the requirements for the physical properties of the red phosphorus flame retardant have become more critical and, thus, red phosphorus flame retardants heretofore available can not fully meet the requirements. In other words, the electronic parts or components using, as an insulator, the nonflammable resinous composition containing the conventional red phosphorus flame retardants are subjected to degradation of insulation and corrosion at metallic portions due to deterioration of the used resin with the passing of time, and thereby their properties are impaired. In such circumstances, it has been pointed out that the known nonflammable articles lack durability and lability. Such a lack is considered to be caused mainly due to deterioration of the red phosphorus flame retardant and, thus, improvement for this has been required. The deterioration of the red phosphorus flame retardant has been considered to be due to the formation of phosphine and corrosive oxidation products resulting from the reaction of the red phosphorus with a small amount of moisture and, as a method of stabilizing the known red phosphorus flame retardants, their powders are coated with various substances so as to be screened from the contact with moisture. However, actually, such a known method itself has limitations and, thus, can not meet the requirements for resinous materials intended to use in high performance electronic components in which an extremely high resistance to moisture and corrosion is required.

As an alternative method to render the insulating cast resin nonflammable for the high voltage applications, organic halide flame retardants have been practically used either singly or in combination with antimony trioxide in some cases, because they have good moisture resistance and corrosion resistance as compared to the foregoing red phosphorus. However, these known halide flame retardants, in addition to the inherent disadvantage that they evolve a large quantity of poisonous gases when burning cause serious deterioration of the electrical properties of the resins because of the use of them is required in large amounts. Further, since the halide flame retardants are expensive, the production cost is increased.

In contrast to this, red phosphorus is considered as a hopeful flame retardant material meeting the requirements, such as safety and minimization of environmental pollution, because evolution of poisonous gases and smoking when burning are slight as compared with the organic halides. Further, since it exhibits a very high flame-retarding ability in a small amount, the use of it not only reduces detrimental effects on the physical properties of the resins, but also is advantageous from the point of cost. Under such circumstances, there is a growing demand for improvements in the heat resistance and moisture resistance of flame retardants of red phosphorus and more stabilized red phosphorus flame retardants are awaited.

Thermoplastic resins have been extensively used in various fields, such as electric articles, machines, automobiles and buildings, because of their superior physical and chemical properties. Generally, thermoplastic resins are subjected to mixing and molding operations at relatively high temperatures in comparison with thermosetting resins and, thus, red phosphorus flame retardant has not so often been used in the resins because of the lack of thermal stability. As other known flame retardants, organic halides, organic phosphorus compounds, antimony trioxide, etc., have been used practically either singly or combinations thereof in thermoplastic resins. However, these known flame retardants have, for example, the disadvantages that they present problems in safety and stability or cause serious deterioration of the physical properties of the resins. Recently, with an increasing demand for much higher quality in all industrial fields, the requirements for thermoplastic resins have also become more strict. For example, with respect to nonflammability contemplated by the present invention, with increasing public demand for safety, a further higher technique has been required not only for obtaining a higher burning resistance but also for securing safety in working and burning and stability. However, most of these retardants can not meet such a requirement. For example, thermoplastic resins are subjected to forming operations at relatively high temperatures and, during such a high temperature operation, the organic halide flame retardant yields corrosive thermal decomposition products or hydrolysis products, thereby damaging the metal mold. Further, after molding, bleed-out occurs at the surfaces of the resulting molded articles and the surface appearance and the electrical properties of the articles are impaired. Further, the organic halide flame retardant should be added in large amounts to impart an enough burning resistance to the resulting products but such a large amount of addition not only adversely affects the mechanical properties, such as tensile strength, folding endurance or impact resistance, but also results in increased production cost. In recent years, as the most serious problems associated with the use of organic halide flame retardants in thermoplastic resins, particular attention has been given to the problems caused by a large amount of smoke or toxic gas generated when burning. With an increasing demand for safety from burning in the use of synthetic resins, the additives like organic halides, which may cause evolution of a large quantity of gas pollutants when burning, have been gradually limited from the viewpoints of personal safety and maintenance of equipments or tools. Antimony trioxide has been usually employed as a flame-retarding assistant for, the organic halide flame retardants, but it not only exhibits detrimental effects on the physical properties of the used resins, particularly with regard to the reduction of tensile strength and impact resistance, but also presents problems or troubles in ensuring the safety of working environments because of its toxicity. Further, it has known that most organic phosphorus compounds themselves act as a plasticizer and, therefore, cause an unfavorable reduction in the heat-resistance and mechanical properties of resins. Also, the organic phosphorus compounds increase the water absorbing property of the nonflammable resinous article, thereby leading to an unfavorable deformation of the article.

In contrast to this, red phosphorus exhibits a very high flame-retarding ability in a small amount and evolution of poisonous gases and smoking are slight as compared to the halide type flame retardant. Therefore, red phosphorus is considered as a hopeful flame retardant material which is safe from burning and minimizes environmental pollution problems. Under such circumstances, the foregoing methods of stabilizing red phosphorus powder by coating have been tried to improve the heat resistance of the red phosphorus flame retardant used in thermoplastic resins, but they have not been successful. Therefore, there is a growing demand for a red phosphorus flame retardant which is stable and safe in working and burning.

In response to such a demand, the present inventors have made many studies on the foregoing problems, such as moisture resistance, corrosion resistance and heat resistance of red phosphorus as a flame retardant, and consider that there are limitations in the conventional method for surface treating red phosphorus powder. On the base of such consideration, the inventors have carefully studied the properties in question from a different angle and, as a result, found that the red phosphorus powder obtained from a novel process different from any prior art have a special configuration and are entirely different in their surface states and physical properties from those obtained from the prior art. The novel red phosphorus has a very high stability and may be employed as a flame retardant as it is. However, such a novel type of red phosphorus has been found to be considerably stabilized by a surface modifying treatment and, thereby, be very useful as a flame retardant for resin compositions. The present inventions have been arrived based on the above findings wherein the above problems with respect to moisture resistance, corrosion resistance and heat resistance can be overcome.

SUMMARY OF THE INVENTION

Therefore, an object of the present invention is to provide a flame retardant of red phosphorus and a nonflammable resinous composition containing the same in which the flame retardant is provided in a special surface, configuration and thereby its properties, particularly with respect to moisture resistance, corrosion resistance and thermal stability are greatly improved.

Another object of the present invention is to make it possible to work or handle with ease and in safety.

A further object of the present invention to provide red phosphorus coated with resin and/or hydroxide, such as aluminum hydroxide and/or zinc hydroxide.

According to the present invention, there is directly provided a flame retardant material of red phosphorus powder in the form of spherical fine particles free of pulverized angular face and aggregate thereof by a conversion process of yellow phosphorus without requiring pulverizing process.

In a further feature of the present invention, the red phosphorus may be coated with thermosetting resin and/or hydroxide, such as aluminum hydroxide and/or zinc hydroxide.

In a still further feature, a nonflammable resinous composition eliminating the foregoing troubles or problems heretofore experienced can be obtained by adding the red phosphorus as a flame retardant to synthetic resins, i.e., thermosetting resin or thermoplastic resin. As the thermosetting resin, epoxy resins can be used and the thermoplastic resin may be at least one selected from the group consisting of polyamide, polyester, polyether, polycarbonate, polystyrene, polyurethane and polyacrylate.

DETAILED DESCRIPTION OF THE PREFERRED EMBODIMENTS

Red phosphorus has been usually produced by heat treating yellow phosphorus over a period of several days in a reactor and the red phosphorus resulting from such a known process has been obtained as a solidly coagulated cake-like lump of high density. When red phosphorus is used as a flame retardant in synthetic resins, it should be in a fine powder form and, thus, a pulverizing step is indispensable for the conventional red phosphorus obtained as a lump.

In contrast to this, according to the present invention, there is directly obtained red phosphorus in a fine powder form by a novel conversion process, without requiring a pulverization step and the thus obtained red phosphorus is a light amorphous powder having a small bulk density, in comparison with the conventional pulverized powder of red phosphorus. Although such light, amorphous red phosphorus itself is highly stable, a very high stability can be obtained by coating a thermosetting resin and/or hydroxide, such as aluminum hydroxide and/or zinc hydroxide, and the reactivity of the coated red phosphorus to moisture is almost negligibly small in comparison with the reactivity of known pulverized red phosphorus similarly coated. When the coated phosphorus of the present invention is incorporated as a flame retardant into synthetic resin, the resulting nonflammable resinous composition is outstandingly improved in moisture resistance and corrosion resistance as compared to any known nonflammable compound and, with respect to these properties, is well comparable with a resinous composition not containing a flame retardant. Further, since the coated red phosphorus of the present invention has a high ignition point, it can be safely incorporated into thermoplastic resin without accompanying evolution of phosphine gas.

It is considered that the unusual stability of the flame retardant of the present invention is ascribable to the surface state of the red phosphorus which is quite different from the surface state of the pulverized red phosphorus in the prior art. More specifically, pulverized powder obtained by pulverizing a strongly coagulated lump, as in the prior art, is made up of particles having a complicated polyhedral configuration consisting of acute ridge lines and sharp-edged angular facets. In contrast to this, since the particles of the present invention are not subjected to pulverization, such ridge lines and facets are rarely found. It has been confirmed by means of an electron microscope that the invention red phosphorus powder is made up of spherical fine particles having a naturally occurring continuous surface and aggregate thereof. In the specification, the red phosphorus of the present invention is referred to as "spherical red phosphorus" in the sense of a red phosphorus having a spherical surface.

In the known pulverized red phosphorus, since the pulverizing step produces many active sites on the surface of particle and makes it labile, moisture and oxygen tend to adhere onto the sites and thereby phosphine and oxidation products result from disproportionation and burning occurs. On the other hand, such active sites are rarely found in the spherical red phosphorus particles which have not been subjected to a pulverization process and their surface state is very stable. Therefore, it can be considered that adsorption of oxygen and moisture and disproportionation do not occur in the spherical red phosphorus and the red phosphorus itself is considerably stabilized. Further, with respect to coating of red phosphorus powder with thermosetting resin or aluminum hydroxide, etc., it is difficult to coat uniformly the pulverized powder due to its surface state and some portions of the unstable faces tend to be left uncoated. In contrast to this, the spherical red phosphorus can be uniformly and wholly coated and, it is considered that such a difference in uniformity of the coating leads to a definitive difference in stability over known pulverized powder.

Since the spherical red phosphorus itself has such a very highly stable surface, it exhibits abilities which are by no means inferior to any conventional coated flame retardant obtained from the pulverized red phosphorus, even when it is employed as a flame retardant without any coating treatment, in applications in which the required levels for moisture resistance and corrosion resistance are not so high, or the operation temperatures, for example, in mixing with resin or molding, are relatively low. However, for applications such as electronic parts, in which high levels of moisture-resistance and corrosion resistance are required, or for use in resins with a high molding temperature, it is desired to coat the spherical red phosphorus with a thermosetting resin or hydroxide, such as aluminum hydroxide, and thereby most of the possible problems which may be caused by the addition of the red phosphorus flame retardant will be eliminated.

This coating not only provides almost perfect red phosphorus in moisture resistance and corrosion resistance properties, but also favorably increases the compatibility with resins used in the preparation of a nonflammable composition, thereby facilitating processing operations.

As a further advantage of the coated red phosphorus of the present invention it has no detrimental effect on the inherent properties of the used resin. It has been known that when the conventional pulverized red phosphorus is added as a flame retardant to a resinous composition, the tensile strength, flexural strength and electrical properties of the resin are adversely affected. However, such deterious effects on those physical properties are hardly detected on addition of the spherical red phosphorus of the present invention to the resinous composition. The deterioration of the physical properties of the resin associated with the addition of the pulverized red phosphorus is considered to be caused by the surface state of the particles having angular pulverized faces and the degradation products. In contrast to this, the spherical red phosphorus powder is not only chemically stable, but also has an advantageous shape causing no deterioration of the physical properties of the resin.

As set forth above, the nonflammable resinous composition according to the present invention can be safely handled and is highly stabilized by using the spherical red phosphorus as a flame retardant, without losing the advantages of the red phosphorus flame retardant.

The spherical red phosphorus according to the present invention can be produced by the following method.

In a sealed container filled with an inert gas, yellow phosphorus is heated to a temperature near its boiling temperature to initiate the conversion reaction to red phosphorus, and when the resulting nuclei of red phosphorus are grown to the desired particle size, the conversion reaction is discontinued. After removing unconverted yellow phosphorus, the spherical red phosphorus is obtained in a fine powder form having a small bulk density, without requiring any pulverizing process. The conversion ratio and the particle size of the red phosphorus can be arbitrarily adjusted by controlling the time and temperature of the conversion process. As preferable conditions of the production of the red phosphorus contemplated by the resent invention, the reaction temperature is in the range of 250° to 600° C. and the conversion is 70% or less. When the reaction temperature is less than 250° C., the conversion rate is slow and is impractical. On the other hand, since a temperature exceeding 600° C. makes it difficult to control of the conversion, the resulting products are not uniform in their properties and can not satisfy the requirements for the surface shape purposed by the present invention. When the conversion is more than 70%, the resulting red phosphorus becomes a lump and needs a pulverizing step for use as a flame retardant. This pulverizing step makes it impossible to achieve the objects of the present invention. Usually, the longer the reaction time and the higher the reaction temperature, the greater the conversion and the larger the particle size become. For example, conversion at 280° C. for four hours provides a conversion of 40% and an average particle size of 50 $\mu$m. The particle size distribution of the red phosphorus thus obtained is in a very narrow range and extremely uniform as compared to the ordinary pulverized powder. Therefore, even in case where the invention red phosphorus has the same average particle size as that of the pulverized one, it has a higher porosity, and, thereby, it can be obtained as a light powder having a small bulk density. In the nonflammable composition of the present invention, the particle size of the red phosphorus may be 200 $\mu$m or less, and, more preferably, it is 100 $\mu$m or less in view of influence on the physical properties of the resulting resinous composition and the appearance quality of the molded articles.

In the present invention, when the foregoing spherical red phosphorus is desired to be coated with hydroxide, an aqueous solution of water-soluble salts of aluminum or zinc, for example, aluminum sulfate, aluminum chloride, zinc sulfate or zinc chloride, is added to an aqueous suspension of the red phosphorus powder and is allowed to be adsorbed onto the powder in the form of aluminum hydroxide or zinc hydroxide resulted from neutralization by sodium hydroxide or double decomposition by addition of ammonium bicarbonate. In this coating, if necessary, the foregoing water soluble salts may be used in combination thereof to form aluminum hydroxide and zinc hydroxide on the red phosphorus powder.

In practicing this coating process, it is preferred that the amount of the red phosphorus in the aqueous suspension be in the range of 10 to 100 parts by weight with respect to 100 parts by weight of water and the concentration of the water soluble salt of aluminum or zinc in the aqueous solution be in the range of 5 to 30% by weight. The coating amount of the hydroxide is preferably from 0.3 to 30 parts by weight with respect to 100 parts by weight of the red phosphorus and, thereby, a superior red phosphorus flame retardant can be obtained. However, this invention is not limited only to those.

In the present invention, when the spherical red phosphorus is required to be coated with thermosetting resin, any raw material of the resin and its initial condensate may be used as long as they can readily cause polymerization in the red phosphorus aqueous suspension or the initial condensate can be emulsified in the suspension, and are allowed to uniformly deposit onto the surface of the red phosphorus powder, thereby forming a coating of the thermosetting resin. Usually, the coating material is selected from various types of materials, such as phenol-formaldehyde system, urea-formaldehyde system, melamine-formaldehyde system, furfuryl alcohol-formaldehyde system, aniline-formaldehyde system and polyhydric alcohol-polybasic acid system and, among them, for example, the materials of furfuryl alcohol-formaldehyde system, aniline-formaldehyde system and polyhydric alcohol-polybasic acid system are desirably added to the aqueous red phosphorus suspension after preparing their initial condensation products, because the polymerization of these materials is difficult in the presence of a large quantity of water.

Although the conditions of coating the red phosphorus with the resin are varied somewhat depending the kind of the used resin, the resin-forming raw material or the initial condensate thereof is added in an amount of 1 to 35 parts by weight with respect to 100 parts by weight of the red phosphorus to an aqueous suspension containing the red phosphorus in an amount of 10 to 100 parts by weight with respect to 100 parts by weight of water. In the case of using the resin-forming raw material, the material is stirred at temperatures of 40° to 100° C. for a period of time of one to three hours, and, in the case of using the initial condensate previously prepared, the condensate is stirred at temperatures of 60° to 100° C. for a period of time of one to two hours. In this step, a polymerization catalyst and a filler, such as aluminum hydroxide, magnesium hydroxide or titanium hydroxide, may be coexistent in the mixture. Addition of the filler increases the mechanical strength of the resin coating and, at the same time, has an effect of covering the purple color characteristic of red phosphorus, thereby making contribution to a further expanded use of the red phosphorus of the present invention. The filler is preferably added in amounts of 1 to 35 parts by weight with respect to 100 parts by weight of the red phosphorus. The intended reaction product is removed, washed with water and is dried at temperatures of 130° to 140° C. to complete the polymerization reaction. After such procedures, there can be obtained the invention red phosphorus flame retardant having a very high level of stability combined with a very high resistance to moisture and corrosion.

As a further method, when aluminum hydroxide and/or zinc hydroxide is adsorbed onto the red phosphorus powder prior to coating with the thermosetting resin, the red phosphorus is further improved in its moisture resistance, corrosion resistance and stability and the resinous composition which is rendered nonflammable by the red phosphorus thus coated is not affected by the addition of the red phosphorus over a long period of time. The pretreatment with aluminum hydroxide and zinc hydroxide is performed in an aqueous suspension containing 100 parts by weight of water and 5 to 100 parts by weight of the red phosphorus by forming aluminum hydroxide or zinc hydroxide by the neutralization of a water soluble compound, such as sulfate or chloride of aluminum or zinc, with caustic alkali or double decomposition with ammonium bicarbonate and then causing adsorption of the thus formed hydroxide onto the red phosphorus powder. The aluminum salt or zinc salt is added in amounts required to yield 0.1 to 30 parts by weight of the hydroxide with respect to 100 parts by weight of the red phosphorus.

As shown in Examples below, the red phosphorus flame retardant of the present invention exhibits an extremely high resistance to moisture and corrosion and is extremely highly stable. Further, this flame retardant has a high ignition temperature and hardly causes the problems of phosphine and corrosive oxidation products, which are considered to be produced due to adsorption of oxygen and moisture. As a result, the red phosphorus may be safely incorporated into resins to be cast at high temperatures and resinous compositions containing it can be stored stably over a long period in the presence of moisture or at high temperatures, without deterioration. Such advantageous properties make the red phosphorus highly valuable and useful in nonflammable resinous compositions.

For example, since the red phosphorus flame retardant according to the present invention is free from the deterioration problems of resinous compositions due to the deterioration of red phosphorus flame retardant, it is desirable as a flame retardant for thermosetting resins used in high voltage electronic parts in which a high degree of stability is required.

Therefore, one feature of the present invention resides in the provision of a nonflammable thermosetting resin composition containing the highly stable red phosphorus set forth above, the resinous composition comprising 100 parts by weight of epoxy resin as a thermosetting resin, 5 to 40 parts by weight of the red phosphorus flame retardant, 5 to 150 parts by weight of aluminum hydroxide as a filler or a flame-retarding assistant, 20 to 90 parts by weight of acid anhydride hardener and an appropriate amount of a hardening promoter. In the present invention, the term "epoxy resin" is intended to mean epoxide of aromatic-, alicyclic- or aliphatic-type having one or more epoxy groups in their molecules and, epoxy resin which is liquid at room temperature is particularly preferable for insulating cast resin compositions for electronic parts. For example, bisphenol A diglycidyl ether, bisphenol F diglycidyl ether, and polyglycidyl ester of polycarboxylic acid (e.g. phthalic acid or terephthalic acid), are suitable for practical use.

An excess use of aluminum hydroxide leads to an unfavorable increase in the viscosity of the resinous composition and thereby will present difficulties in the casting operation. On the other hand, an insufficient use of aluminum hydroxide can not provide a sufficient effect as a flame retarding assistant. Therefore, aluminum hydroxide is preferably employed in the range of 5 to 150 parts by weight with respect to 100 parts by weight of epoxy resin.

The amount of the red phosphorus flame retardant is preferably in the range of 5 to 40 parts by weight with respect to 100 parts by weight of epoxy resin, taking into account the flame retarding effect and the influence on the viscosity of the resin.

As the hardener, an acid anhydride is most preferable and known anhydrides, such as phthalic anhydride, tetrahydrophthalic anhydride, succinic anhydride, etc., are widely useful. As the hardening promoter, imidazole derivatives of 2-phenylimidazole, 2-ethyl-4-methylimidazole, etc., are preferable from the viewpoint of ease of operations.

The red phosphorus of the present invention may be also used with thermoplastic resin and is particularly useful in the so-called engineering plastic compositions for structural materials and functional parts of electric articles or machines which are used under relatively severe conditions and the present invention is directed to a resinous composition for such applications.

The thermoplastic resin to be rendered nonflammable by the present invention may be selected from the group consisting of polyamide, polyester, polyether, polycarbonate, polystyrene, polyurethane and polyacrylate. In addition to the red phosphorus flame retardant, appropriate additives known in the art, such as filler, stabilizer, plasticizer, colorant, glass fiber or lubricant may be added, if necessary. The red phosphorus flame retardant is preferably added in an amount of 0.1 to 30 parts by weight with respect to 100 parts by weight of the thermoplastic resin. When the amount is less than 0.1 part by weight, a sufficient flame retarding effect can not be expected. However, an excess use exceeding 30 parts by weight adversely affects the physical properties of the resin component.

In the nonflammable compositions of the present invention, known flame retardants may be employed in combination of the flame retardant of the present invention if necessary.

The present invention will now be described in detail with reference to the following Examples.

EXAMPLE 1

Preparation of Spherical Red Phosphorus 500 g of yellow phosphorus was placed in the stainless vessel filled with nitrogen gas, sealed and heated at 270° C. for four hours to convert it to red phosphorus. Unconverted yellow phosphorus was removed and there was obtained 211 g of spherical red phosphorus in flowable spherical powder having an average particle size of 50 $\mu$m and a bulk density of 0.86 g/cm$^3$. The spherical red phosphorus thus obtained was employed in the following Examples.

EXAMPLE 2

500 g of the spherical red phosphorus was suspended in 800 ml of water and then 300 ml of a 10% aqueous solution of aluminum sulfate was added. After 100 ml of a 5% aqueous solution of sodium hydroxide was added dropwise while fully stirring, the suspension was heated to 50° C. and was kept at the temperature for 30 minutes. The resultant suspension was filtered, washed with water and dried at 120° C. The yield of the resultant coated red phosphorus was 516 g.

EXAMPLE 3

500 g of the spherical red phosphorus was suspended in 800 ml of water and then 200 ml of a 20% aqueous solution of aluminum chloride wa added. To this suspension, 400 ml of a 20% aqueous solution of ammonium bicarbonate was added dropwise while thoroughly stirring and the suspension was heated to 50° C. and allowed to stand at 50° C. for 30 minutes. After cooling in the air, the suspension was filtered, washed with water and dried at 120° C. The yield of the coated red phosphorus thus obtained was 536 g.

EXAMPLE 4

500 g of the spherical red phosphorus was suspended in 800 g of water and 300 ml of a 20% aqueous solution of zinc chloride was added. 400 ml of a 10% sodium hydroxide aqueous solution was added dropwise to the suspension under stirring and the suspension was heated to 50° C. and then allowed to stand at this temperature for 30 minutes. After cooling in the air, the resultant suspension was filtered, washed with water and dried at 120° C. The yield of the coated red phosphorus thus obtained was 540 g.

EXAMPLE 5

500 g of the spherical red phosphorus was suspended in 1,000 ml of water and then 15 g of phenol and 27 g of 37% formalin was added. After heating this suspension to 80° C., 10 g of 85% phosphoric acid was added while stirring, and heated at this temperature for a period of one hour under stirring. Then the suspension was cooled in the air, filtered and washed with water. The filtered product was dried at 140° C. over a period of three hours. The coated red phosphorus thus obtained was 523 g.

EXAMPLE 6

500 g of the spherical red phosphorus was suspended in 750 ml of water and 10 g of urea and 20 g of 37% formalin were added to the suspension. The suspension was heated to 90° C. under agitation and, after adding 10 g of 85% phosphoric acid, heated at this temperature for a period of two hours under stirring. After allowing the suspension to stand over a whole day and night, the suspension was filtered, washed with water and dried at 140° C. for three hours. The coated red phosphorus thus obtained was 514 g.

EXAMPLE 7

A viscous initial condensate which was obtained by reacting a mixture consisting of 27 g of furfuryl alcohol, 3 ml of water and 0.5 g of 85% phosphoric acid on a boiled water bath for five hours and 10 g of 37% formalin were added to a suspension consisting of 500 g of the spherical red phsphorus and 800 ml of water under strong agitation and then was heated to 90° C. After heating at the same temperature for one hour under stirring, the suspension was filtered, washed with water and dried at 130° C. for a period of three hours. The coated red phosphorus thus obtained was 525 g.

EXAMPLE 8

6 g of melamine, 28 g of 37% formalin and 10 g of sodium carbonate were added to a suspension consisting of 500 g of the spherical red phosphorus, 50 g of magnesium hydroxide and 750 ml of water and then allowed to react at 90° C. for two hours under stirring. After the resulting mixture was cooled in the air over a whole day and night, it was filtered, washed with water and dried at 135° C. over a period of three hours. The coated red phosphorus thus obtained was 555 g.

EXAMPLE 9

4.3 g of 98% glycerine, 2.5 g of phthalic anhydride and 15 g of fatty acid of linseed oil were mixed and heated to a temperature of 200° to 230° C. while passing carbonic acid gas. To the resulting mixture was added 3.3 g of phthalic anhydride and then the mixture was heated to 245° C. When the acid value of the mixture became 12 to 15, the mixture was cooled, then 2 ml of emulsifying dispersant (e.g., nonionic surfactant) was added, and the resulting mixture was dispersed in 100 ml of water. The resulting emulsion was mixed with a suspension consisting of 750 ml of water, 500 g of the spherical red phosphorus and 50 g of aluminum hydroxide and then stirred at 90° C. for one hour. The resulting mixture was cooled, filtered, washed with water and dried at 140° C. for four hours. The coated red phosphorus thus obtained was 573 g.

EXAMPLE 10

250 g of the spherical red phosphorus was suspended in 500 ml of water, then 40 ml of a 8% aqueous solution of aluminum sulfate was added to the suspension and stirred thoroughly. Thereafter, 18 ml of a 5% aqueous solution of sodium hydroxide was added dropwise to the suspension and the suspension was heated to 50° C. and held at this temperature for 10 minutes. To the suspension, 8 g of phenol and 15 g of 37% formaline were added and the suspension was heated at 80° C. for one hour under agitation. The suspension was cooled in the air, filtered, washed with water and dried at 140° C. for three hours. The yield of the coated red phosphorus was 270 g.

EXAMPLE 11

40 ml of a 8% aqueous solution of aluminum sulfate was added to a suspension consisting of 250 g of the spherical red phosphorus and 500 ml of water and stirred. 45 ml of a 15% aqueous solution of ammonium bicarbonate was added dropwise to the suspension and then the suspension was allowed to stand at 50° C. for 20 minutes. After adjusting the pH of the suspension to 10.0 with an aqueous ammonia, 100 g of 12.5% of a resol type phenol resin prepolymer (phenol/formaldehyde molar ratio: $\frac{1}{2}$) previously prepared and 25 g of ammonium chloride were added to the suspension and stirred at 50° C. for 30 minutes. The resulting suspension was cooled in the air, filtered, washed with water and dried at 120° C. for one hour. The yield of the resulting coated red phosphorus was 264 g.

EXAMPLE 12

80 ml of a 8% aqueous solution of zinc sulfate was added to a suspension consisting of 500 g of the spherical red phosphorus and 900 ml of water and stirred. Further, 100 ml of a 15% aqueous solution of ammonium bicarbonate was added dropwise and heated at 60° C. for 20 minutes. A reaction mixture of acetone-formulaldehyde initial cordensate prepared from the reaction between 26 g of acetone and 42 g of 37% formalin was added the suspension and heated at 65° C. for 30 minutes under stirring. The resulting suspension was cooled in the air, filtered, washed with water and then dried at 130° C. for one hour. The coated red phosphorus obtained was 572 g.

EXAMPLE 13

65 ml of a 10% aluminum sulfate aqueous solution was added to a suspension consisting of 500 g of the spherical red phosphorus and 750 ml of water and stirred. Then, 100 ml of a 15% aqueous solution of ammonium bicarbonate was added dropwise to the suspension and heated at 60° C. for 20 minutes. Then, a suspension consisting of 30 g of titanium hydroxide and 30 ml of water, 6 g of melamine and 28 g of 37% formalin were added to the suspension and the pH value of the resulting suspension was adjusted to 7.5 with an aqueous ammonia. After stirring the suspension such adjusted at 90° C. for two hours and leaving over a whole day and night in the air, the suspension was filtered, washed with water and dried at 135° C. for three hours. The coated red phosphorus thus obtained was 518 g.

In order to examine the chemical properties of the uncoated spherical red phosphorus (Example 1) and the coated spherical red phosphorus (Examples 2 to 13), their ignition points, the amounts of evolved phosphine and the eluted $P_2O_5$ were measured and the results are given in Table 1. For the purpose for comparison, the following comparative flame retardants (Comparative Examples 1 to 7) were examined in the same manner as set forth above.

COMPARATIVE EXAMPLE 1

Red phosphorus commercially available (bulk density: 1.12 g/cm$^3$)

COMPARATIVE EXAMPLES 2, 3, 4, 5, 6 and 7:

Coated pulverized red phosphorus obtained by treating the pulverized one (Comparative Example 1) in the same way as in Examples 2, 5, 6, 10, 11 and 12, respectively.

TABLE 1

| Flame Retardant | Ignition Point(°C.) | Evolution of Phosphine (ppm) | Elution of $P_2O_5$ (mg) |
|---|---|---|---|
| Example No. | | | |
| 1 | 345 | 0.1 | 31.5 |
| 2 | 348 | 0.0 | 5.3 |
| 3 | 350 | 0.0 | 4.7 |
| 4 | 349 | 0.0 | 6.5 |
| 5 | 355 | 0.0 | 5.6 |
| 6 | 353 | 0.0 | 6.1 |
| 7 | 350 | 0.0 | 5.8 |
| 8 | 351 | 0.0 | 7.3 |
| 9 | 352 | 0.0 | 7.9 |
| 10 | 357 | 0.0 | 3.7 |
| 11 | 358 | 0.0 | 3.1 |
| 12 | 355 | 0.0 | 2.8 |
| 13 | 352 | 0.0 | 4.2 |
| Comparative Example No. | | | |
| 1 | 291 | 225.3 | 213.1 |
| 2 | 295 | 76.3 | 121.2 |
| 3 | 329 | 1.4 | 67.5 |
| 4 | 327 | 1.4 | 66.9 |
| 5 | 341 | 0.2 | 42.3 |
| 6 | 335 | 0.3 | 48.7 |
| 7 | 331 | 0.2 | 40.8 |

Measurement Method

Bulk density: 10 g of each sample was taken in a bulkdensitometer (Volume: 20 ml) and, after shaking 100 times, bulk density was measured Ignition Point: 1 g of each sample was placed in a 10 ml porcelain crucible, then put in an electric furnace and heated at a heating rate of 1° C./min to measure Ignition point.

Evolution of phosphine: 20 g of each sample was suspended in 40 ml of water contained in a 500 ml flask and was fully shaken. Then, the sealed sample was allowed to stand for 24 hours and the amount of phosphine evolved in a space above the suspension was measured.

Elution of $P_2O_5$: 5 g of each sample was suspended in 100 ml of water, was allowed to stand for 100 hours at 121° C. at 2 atm. and filtered. The $P_2O_5$ content in the filtrate was measured.

In order to show the advantageous effects of the nonflammable epoxy resin compositions of the present invention, the various compositions (Examples 14 to 26) containing the spherical red phosphorus (Example 1) or the spherical red phosphorus coated in Examples 2 to 13 were thoroughly mixed, hardened by heating at 60° C. for four hours and then at 105° C. for seven hours. The hardened compositions were tested for their flame resistance, moisture resistance, corrosion resistance and electrical properties and were compared with comparative nonflammable epoxy resin compositions (comparative Examples No. 8 to 11) containing the pulverized red phosphorus flame retardants. The flame retardants used in Comparative Examples No. 8, 9, 10 and 11 were coated by treating the pulverized red phosphorus (Comparative Example 1) in the same ways as described in Example Nos. 2, 5, 7 and 11, respectively. Table 2 shows the compositions of the present invention and the comparative examples and Table 3 shows the test results.

TABLE 2

| | Composition (parts by weight) | | | | | | | | | | | | | | | | |
|---|---|---|---|---|---|---|---|---|---|---|---|---|---|---|---|---|---|
| | Examples of the Present Invention | | | | | | | | | | | | | Comparative Example | | | |
| Ingredient | 14 | 15 | 16 | 17 | 18 | 19 | 20 | 21 | 22 | 23 | 24 | 25 | 26 | 8 | 9 | 10 | 11 |
| Bisphenole A diglycidyl ether | 100 | | 100 | 100 | 100 | 100 | | | 100 | 100 | | | 100 | 100 | 100 | | |
| Hexahydrophthalic acid diglycidyl ether | | 100 | | | | | 100 | 100 | | | 100 | 100 | | | | 100 | 100 |
| Tetrahydrophthalic anhydride | 30 | | 30 | 30 | 25 | | | | 30 | 25 | | | 25 | 25 | | 25 | |
| Hexahydrophthalic anhydride | | 25 | | | | 30 | 25 | 40 | | | 30 | 25 | 25 | | 30 | | 20 |
| 2-Methyl imidazole | 1.2 | 1.0 | 1.2 | 1.2 | 1.2 | 1.2 | 1.0 | 1.0 | 1.2 | 1.2 | 1.0 | 1.0 | 1.2 | 1.2 | 1.0 | 1.2 | 1.2 |
| Aluminum hydroxide | 50 | 20 | 50 | 50 | 10 | 120 | 80 | 50 | 50 | 20 | 120 | 70 | 40 | 30 | 20 | 50 | 80 |
| Coupling reagent | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Red Phosphorus Example No. | 2 | 3 | 4 | 5 | 6 | 7 | 8 | 9 | 10 | 11 | 12 | 13 | 1 | | | | |
| Addition | 20 | 20 | 30 | 10 | 20 | 30 | 20 | 25 | 15 | 20 | 25 | 10 | 20 | 30 | 20 | 30 | 25 |

TABLE 3

| | Present Invention | | | | | | | | | | | | |
|---|---|---|---|---|---|---|---|---|---|---|---|---|---|
| Example No. | 14 | 15 | 16 | 17 | 18 | 19 | 20 | 21 | 22 | 23 | 24 | 25 | 26 |
| Flame Resistance | V–O | V–O | V–O | V–O | V–O | V–O | V–O | V–O | V–O | V–O | V–O | V–O | V–O |
| Moisture Resistance (Water Absorption) % | 0.07 | 0.08 | 0.12 | 0.07 | 0.06 | 0.08 | 0.11 | 0.07 | 0.10 | 0.04 | 0.05 | 0.05 | 2.15 |
| Corrosion Resistance % Dielectric Constant at 10 KHz | 1 | 1 | 1 | 1 | 0 | 1 | 1 | 0 | 0 | 0 | 0 | 0 | 11 |

TABLE 3-continued

| | Present Invention | | | | | | | | | | | | |
|---|---|---|---|---|---|---|---|---|---|---|---|---|
| Before Corrosion Test | 3.91 | 3.87 | 3.88 | 3.89 | 3.92 | 4.00 | 3.88 | 3.91 | 3.99 | 4.02 | 3.87 | 3.90 | 4.06 |
| After Corrosion Test | 3.95 | 3.96 | 4.01 | 3.92 | 3.95 | 4.02 | 4.02 | 3.93 | 4.00 | 4.01 | 3.88 | 3.90 | 4.23 |
| Dielectric Dissipation Factor at 10 KHz at 25° C. | | | | | | | | | | | | | |
| Before Corrosion Test | 0.65 | 0.64 | 0.64 | 0.62 | 0.62 | 0.68 | 0.63 | 0.62 | 0.65 | 0.65 | 0.64 | 0.62 | 0.66 |
| After Corrosion Test | 0.92 | 0.93 | 0.93 | 0.81 | 0.82 | 1.11 | 0.92 | 0.93 | 0.76 | 0.78 | 0.75 | 0.71 | 4.15 |

| | Comparative Example No. | 8 | 9 | 10 | 11 |
|---|---|---|---|---|---|
| | Flame Resistance | V-O | V-O | V-O | V-O |
| | Moisture Resistance (Water Absorption) % | 8.11 | 4.82 | 4.88 | 3.24 |
| | Corrosion Resistance % | 62 | 32 | 40 | 26 |
| | Dielectric Constant at 10 KHz | | | | |
| | Before Corrosion Test | 4.08 | 4.02 | 4.01 | 3.97 |
| | After Corrosion Test | 6.02 | 5.40 | 5.64 | 4.70 |
| | Dielectric Dissipation Factor at 10 KHz at 25° C. | | | | |
| | Before Corrosion Test | 0.68 | 0.67 | 0.68 | 0.63 |
| | After Corrosion Test | 9.21 | 8.82 | 8.35 | 7.72 |

Testing Method

Flame Resistance: Measured in accordance to the testing method B for flame resistance specified in JIS K-6911

Moisture Resistance (Water Absorption): In accordance to testing method of boiling water absorption specified in JIS K-6911. (Measurement conditions: 121° C., 2 atm, 100% RH and 100 hours)

Corrosion Resistance: Each resin composition in a given amount was applied onto a copper plate having a specified surface area, hardened, and then allowed to stand in the air at 140° C., 80% RH for 200 hours to form a resin layer. After peeling the resin layer from the copper plate, a transparent section paper of 1 mm square was placed onto the copper plate and the number of 1 mm square which changed in color was counted in the area of 1 cm$^2$ (1 mm$^2$ × 100)

Dielectric constant and dielectric dissipation factor: Measured in accordance to Measuring methods for dielectric constant and dielectric dissipation factor specified JIS K-6911.

It is clear from the test results that the compositions containing the spherical red phosphorus flame retardant according to the present invention are far superior in all of the tested items to the comparative compositions and the compositions of hhe present invention are hardly affected by the addition of the flame retardant. Therefore, when the nonflammable compositions of the present invention are employed in electronic parts, useful life and reliability can be considerably improved.

EXAMPLES 27-35

Nylon 6, polybutylene terephthalate, polyphenylene oxide, polycarbonate, polystyrene, polyphenylene oxide-polystyrene copolymer and thermoplastic polyurethane resin were each molten in a mixing extruder and then the flame retardants of the spherical red phosphorus obtained in the Examples 1, 2, 4, 5, 6 and 10 were added to each resin melt. In Example 35, 5 parts by weight of glass fiber was used as a filler. Test samples were made by extruding the resulting mixtures through a nozzle. Table 4 shows the compositions of the test samples thus obtained.

COMPARATIVE EXAMPLES 12 to 20

For the purpose of comparison, comparative test samples were prepared in the same manner described in Examples 27-35 except that the uncoated or coated pulverized red phosphorus obtained in the Comparative Examples 1-4 were employed as a flame retardant. The compositions of the samples are shown in parts by weight in Table 4.

TABLE 4

| Thermoplastic Resin Composition (parts by weight) | | | | |
|---|---|---|---|---|
| | Resin | | Red Phosphorus | |
| Example No. | | | | |
| 27 | Polyamide (Nylon 6) | 90 | Example 1 | 10 |
| 28 | Polyamide (Nylon 6) | 90 | Example 2 | 10 |
| 29 | Polybutylene terephthalate | 85 | Example 4 | 15 |
| 30 | Polyphenylene oxide | 95 | Example 2 | 5 |
| 31 | Polycarbonate | 90 | Example 5 | 10 |
| 32 | Polystyrene | 80 | Example 6 | 20 |
| 33 | Polyphenylene oxide Polystyrene | 65 25 | Example 10 | 10 |
| 34 | Polyurethane | 85 | Example 2 | 15 |
| 35 | Polybutylene terephthalate | 85 | Example 2 | 10 |
| Comparative Example No. | | | | |
| 12 | Polyamide (Nylon 6) | 90 | Comparative Example 1 | 10 |
| 13 | Polyamide (Nylon 6) | 90 | Comparative Example 2 | 10 |
| 14 | Polybutylene terephthalate | 85 | Comparative Example 3 | 15 |
| 15 | Polyphenylene oxide | 95 | Comparative Example 2 | 5 |
| 16 | Polycarbonate | 90 | Comparative Example 3 | 10 |
| 17 | Polystyrene | 25 | Comparative Example 4 | 20 |
| 18 | Polyphenylene oxide Polystyrene | 65 25 | Comparative Example 3 | 10 |
| 19 | Polyurethane | 85 | Comparative Example 2 | 15 |
| 20 | Polybutylene terephthalate | 85 | Comparative Example 2 | 10 |

The samples obtained above were tested for the properties given in Table 5 and the test results have proved that the resinous compositions which were rendered nonfammable by the spherical red phosphorus of the present invention are far superior to those using the conventional pulverized red phosphorus and are hardly affected by the addition of the spherical red phosphorus. From such results, the nonflammable composition of thermoplastic resin according to the present invention are almost free from the disadvantages associated with the conventional red phosphorus flame retardant while maintaining the advantages of the conventional red phosphorus and are very useful. Therefore, the nonflammable resinous composition of the present invention can be extensively used in a variety of applications, such as various molded articles, films and sheets.

TABLE 5

| | Burning Resistance | Tensile Strength | | Dielectric Strength | | Bending Strength | | Moisture Resistance % |
|---|---|---|---|---|---|---|---|---|
| | | after Molding kg/cm² | Reduction % | after Molding kv/mm | Reduction % | after Molding kg/cm² | Reduction % | |
| Example No. | | | | | | | | |
| 27 | V-O | 790 | 16.1 | 15.7 | 4.9 | 970 | 14.7 | 0.46 |
| 28 | V-O | 790 | 5.2 | 15.7 | 2.3 | 970 | 4.2 | 0.08 |
| 29 | V-O | 730 | 6.8 | 14.2 | 3.1 | 1180 | 5.1 | 0.09 |
| 30 | V-O | 770 | 4.8 | 16.7 | 3.4 | 1060 | 4.1 | 0.06 |
| 31 | V-O | 660 | 5.1 | 17.7 | 2.9 | 890 | 4.6 | 0.07 |
| 32 | V-O | 520 | 7.2 | 18.3 | 4.7 | 980 | 5.8 | 0.05 |
| 33 | V-O | 640 | 5.5 | 20.2 | 3.8 | 1020 | 4.5 | 0.07 |
| 34 | V-O | 550 | 5.7 | 18.1 | 2.8 | 1010 | 4.3 | 0.08 |
| 35 | V-O | 830 | 5.1 | 14.1 | 3.0 | 1210 | 4.1 | 0.08 |
| Comparative Example No. | | | | | | | | |
| 12 | V-O | 560 | 50.2 | 15.6 | 72.2 | 600 | 49.4 | 17.82 |
| 13 | V-O | 560 | 38.4 | 15.7 | 61.5 | 620 | 39.1 | 8.15 |
| 14 | V-O | 520 | 47.1 | 14.1 | 57.2 | 670 | 46.2 | 4.23 |
| 15 | V-O | 680 | 33.1 | 16.8 | 51.4 | 610 | 37.4 | 4.89 |
| 16 | V-O | 510 | 41.4 | 17.7 | 59.2 | 570 | 39.5 | 9.02 |
| 17 | V-O | 380 | 49.2 | 18.2 | 63.8 | 560 | 50.2 | 5.11 |
| 18 | V-O | 430 | 37.3 | 20.2 | 56.5 | 640 | 41.6 | 5.88 |
| 19 | V-O | 360 | 46.2 | 18.0 | 60.4 | 650 | 48.2 | 6.46 |
| 20 | V-O | 610 | 34.4 | 14.1 | 47.2 | 710 | 41.4 | 5.56 |

The test results were all obtained in accordance with ASTM. More specifically, burning resistance was measured in accordance with UL-94 Vertical Burning Test and tensile strength, dielectric strength and bending strength were measured in accordance with 638, 149 and 790, respectively, in which "measurement values after molding" are the values measured immediately after molding and "percentages of reduction" are the percentage of reduction resulted by leaving each samples at 121° C., 2 atm and 100% RH for 100 hours to the values measured after molding. The moisture resistance was calculated as follows: (Percentage of the weight of each test sample which has increased by leaving at 121° C., 2 atm and 100% RH to the weight before leaving)-(Percentage of the increase in weight measured under the same conditions for a reference sample having the same composition as each test sample except that a flame retardant is not contained.)

What is claimed is:

1. A flame retardant comprising spherical particles consisting of red phosphorus and aggregates of said spherical particles, said particles having been directly produced as red phosphorus powder in the form of spherical particles free of pulverized surfaces by conversion of yellow phosphorus, without a pulverizing treatment, said flame retardant having an ignition temperature of at least 345° C.

2. A flame retardant as claimed in claim 1 in which said spherical particles of red phosphorus are produced by heating yellow phosphorus at a temperature of 250° to 600° C. in a reactor filled with an inert gas to cause the conversion of said yellow phosphorus to said spherical particles of red phosphorus in a conversion of 70% or less.

3. A flame retardant as claimed in claim 1 in which said spherical particles are in the form of powder having a particle size of 200 μm or less.

4. A flame retardant as claimed in claim 1 in which said spherical particles are coated with thermosetting resin.

5. A flame retardant as claimed in claim 1 in which said spherical particles are coated with aluminum hydroxide and/or zinc hydroxide.

6. A flame retardant as claimed in claim 1 in which said spherical particles are firstly coated with aluminum hydroxide and/or zinc hydroxide and further coated with thermosetting resin.

7. A flame retardant as claimed in claim 4 in which said thermosetting resin is coated in the presence of at least one compound selected from the group consisting of aluminum hydroxide, magnesium hydroxide and titanium hydroxide.

8. A flame retardant as claimed in claim 6 in which, said thermosetting resin is coated in the presence of at least one compound selected from the group consisting of aluminum hydroxide, magnesium hydroxide and titanium hydroxide.

9. A flame retardant comprising: spherical particles consisting of red phosphorus and agglomerates of said spherical particles, said spherical particles having particle sizes of not greater than 200 μm and having continuous external surfaces which are substantially free of ridges and active sites formed by pulverizing which would be capable of adsorbing moisture and oxygen whereby the surfaces of said particles are stable and adsorption of oxygen and moisture and disproportionation do not occur on said surfaces.

10. A flame retardant as claimed in claim 9 in which said spherical particles of red phosphorus have been prepared by heating yellow phosphorus to a temperature in the range of 250° to 600° C. in a reactor filled with inert gas until not more than about 70 wt. % of said yellow phosphorus has been converted to spherical particles of red phosphorus having a size of not greater than 200 μm, then removing unconverted yellow phosphorus from said spherical particles, the spherical particles having been prepared without subjecting them to a size reduction step after the heating step.

11. A flame reatardant as claimed in claim 9 in which said spherical particles are coated with thermosetting resin.

12. A flame retardant as claimed in claim 9, in which said spherical particles are coated with aluminum hydroxide and/or zinc hydroxide.

13. A flame retardant as claimed in claim 9, in which said spherical particles are firstly coated with aluminum hydroxide and/or zinc hydroxide and further coated with thermosetting resin.

14. A flame retardant as claimed in claim 11, in which said thermosetting resin is coated in the presence of at least one compound selected from the group consisting of aluminum hydroxide, magnesium hydroxide and titanium hydroxide.

15. A flame retardant as claimed in claim 13, in which said thermosetting resin is coated in the presence of at least one compound selected from the group consisting of aluminum hydroxide, magnesium hydroxide and titanium hydroxide.

16. A flame retardant as claimed in claim 1, in which said spherical particles of red phosphorus have been prepared by heating yellow phosphorus to a temperature in the range of 250° to 600° C. in a reactor filled with inert gas until not more than about 70 wt. % of said yellow phosphorus has been converted to spherical particles of red phosphorus having a size of not greater than 200 μm, then removing unconverted yellow phosphorus from said spherical particles, the spherical particles having been prepared without subjecting them to a size reduction step after the heating step.

* * * * *